(12) United States Patent
Sandrart et al.

(10) Patent No.: US 7,137,786 B2
(45) Date of Patent: Nov. 21, 2006

(54) TILTING TRANSMISSION GEARBOX COMPRISING A PIVOTING CONNECTION WITH PLAIN BEARINGS

(75) Inventors: Thierry Sandrart, Velaux (FR); Lionel Thomassey, Fos sur Mer (FR); Giacomo Orsini, Castellazo Bormida (IT)

(73) Assignees: Eurocopter, Marignane Cedex (FR); Avio S.p.A., Turin (IT)

( * ) Notice: Subject to any disclaimer, the term of this patent is extended or adjusted under 35 U.S.C. 154(b) by 155 days.

(21) Appl. No.: 10/494,768

(22) PCT Filed: Oct. 29, 2002

(86) PCT No.: PCT/FR02/03714

§ 371 (c)(1),
(2), (4) Date: Oct. 15, 2004

(87) PCT Pub. No.: WO03/039952

PCT Pub. Date: May 15, 2003

(65) Prior Publication Data

US 2005/0040281 A1    Feb. 24, 2005

(30) Foreign Application Priority Data

Nov. 6, 2001    (FR) .................................. 01 14330

(51) Int. Cl.
*F04F 3/00*    (2006.01)

(52) U.S. Cl. ........................................ 416/148; 244/56
(58) Field of Classification Search ................ 416/148, 416/147; 244/7 R, 7 C, 56, 66
See application file for complete search history.

(56) References Cited

U.S. PATENT DOCUMENTS 6,260,793 B1 * 7/2001 Balayn et al. ............... 244/7 R
6,276,633 B1 * 8/2001 Balayn et al. ................ 244/56
6,830,215 B1 * 12/2004 Sandrart et al. .............. 244/56

FOREIGN PATENT DOCUMENTS

FR    2 791 319    9/2000
FR    2 791 634    10/2000

* cited by examiner

*Primary Examiner*—Edward K. Look
*Assistant Examiner*—Dwayne J White
(74) *Attorney, Agent, or Firm*—Young & Thompson

(57) ABSTRACT

A transmission gearbox (1) has a casing (2) that tilts around a tilting axis (B—B) via two bearings (19). Each of the bearings includes: a fixed part (20) having a sleeve (20a); and a trunnion (21a) which belongs to a pivoting part (21) and which pivots around the sleeve, the pivoting part being solidly connected to the casing (2). A shouldered wear ring (22) is disposed between the sleeve (20a) and the trunnion (21a) of each bearing (19). The invention is suitable for use in the pivot mounting of a power transmission gearbox (1) that is used to rotate the tilting rotor (14) of a convertible aircraft.

10 Claims, 2 Drawing Sheets

Figure 1:
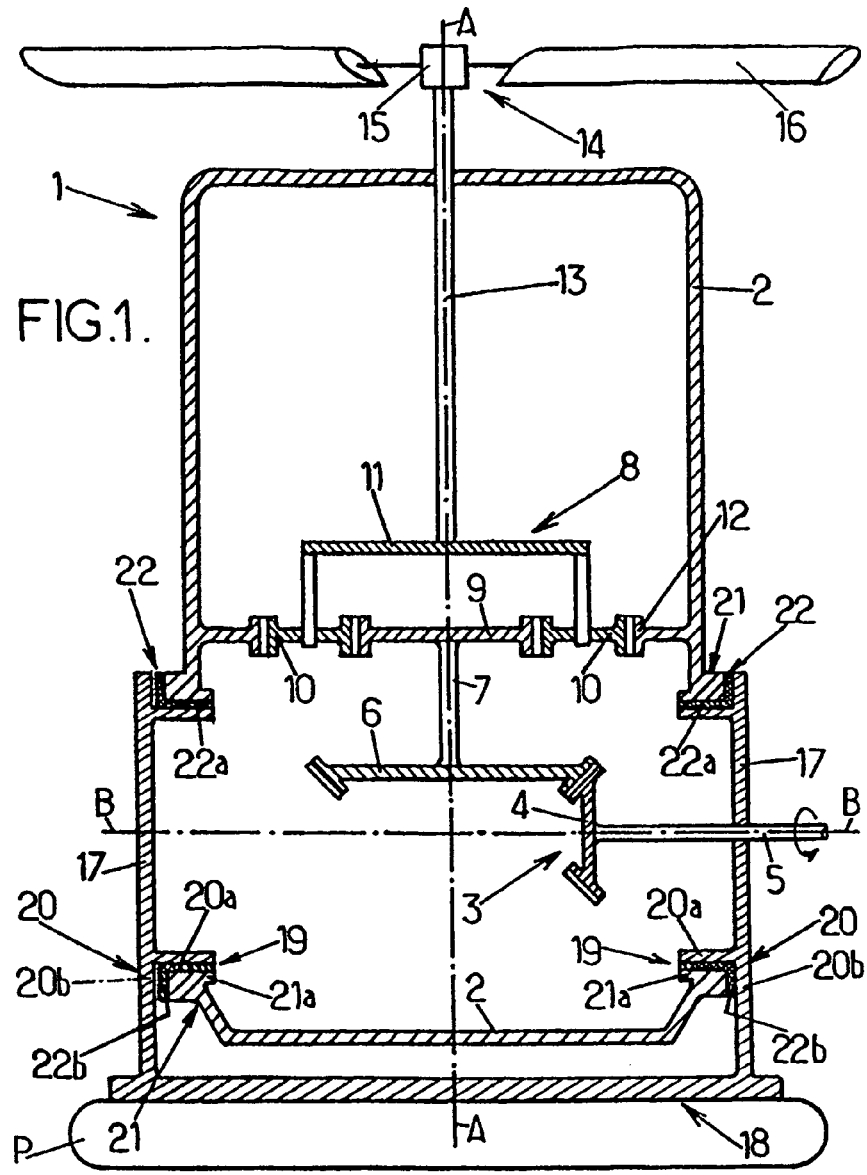

TILTING TRANSMISSION GEARBOX COMPRISING A PIVOTING CONNECTION WITH PLAIN BEARINGS

The invention relates to a tilting transmission gearbox and more specifically to a notched tilting power transmission box swiveling about a tilting axis to drive in rotation at least one device driven about the rotation axis which must be capable of swiveling around the tilting axis, almost perpendicular to the axis of rotation of the driven device, with said transmission box comprising a casing mounted to tilt with respect to and preferably between two fixed and rigid side parts of a support, by two coaxial bearings around said tilting axis and spaced at some distance from one another along this tilting axis.

The tilting power transmission gearbox according to the invention may be used, in a non-limitative manner, as a power transmission box on aircraft having an adjustable propulsion system, such as dirigible balloons or aircraft of the <<convertible>> type or yet again, as a power transmission box on wind generators.

In general, the tilting power transmission gearbox according to the invention may be used in any adjustable propulsion on power generation systems by rotation, which, to operate, require a small axial deflection (in the direction of the tilting axis).

In particular, as an application for which the tilting power transmission gearbox according to the invention is of particular interest to the applicants is a transmission gearbox that can be used for driving in rotation, from at least one source of power, such as a motor-propulsion unit, for instance of the turbomotor type, at least one tilting rotor of a "convertible" type aircraft which can operate in aircraft mode or in helicopter mode and whose drive shaft swivels about a tilting axis so as to be able to change from one position, in which the rotor operates like an aircraft propellor, to fly in aircraft mode, to another position in which the rotor operates like a helicopter rotor for the aircraft to fly in the helicopter mode.

A tilting power gearbox for an aircraft of the convertible type with tilting rotors is described more particularly in FR 2 791 319 and FR 2 791 634, which should be referred to for more details on the subject.

However, it should be noted that these two patents describe a convertible aircraft with tilting rotors of a type in which the drive shaft of each rotor is driven in rotation about its own axis by a front tilting reducing assembly of one respectively of the two power transmission gearboxes each including a fixed rear reducing assembly connected to the corresponding front reducing assembly and, respectively, to one or two motors (turbomotors), each supported respectively one of the two fixed wings of the aircraft and an interconnection shaft connecting the two transmissions to drive the two rotors in rotation by either of the two motors, in the event of the other motor failing.

The shaft of each rotor and the corresponding power transmission as well as the corresponding motor, are housed in respectively one of two articulated casings, each provided with a front part tilting about the tilting axis, and a rear fixed part, attached respectively to one of the two fixed wings of the aircraft and in which are housed the corresponding motor and at least, partly, the rear reducing assembly of the corresponding transmission whose front reducing assembly, constructed like the main helicopter transmission gearbox, and the shaft of the rotor corresponding to it housed in the front tilting part of the casing are assembled to tilt with this front casing part with respect to the fixed rear part of the casing and the corresponding facing wing.

In this application and with this architecture for each power transmission gearbox, the tilting link of front tilting reducer assembly operates only through an angular tilting sector limited to approximately 110° with a low speed of rotation included between approximately 1 and approximately 2 rpm and under a static load.

Accordingly, the two bearings through which the front tilting reducer assembly casing, or the tilting power transmission gearbox is mounted to tilt on the support, i.e. are subject to a <<false Brinnel effect>> which is particularly sensitive when the bearings are of the rolling type, such as needle or roller bearings.

The basic problem of the invention is to reduce or to eliminate entirely this <<false Brinnel effect>> of the bearings and more generally, to propose a tilting setup for the power transmission gearbox on its support, better suiting the various demands of the embodiment of the technique and more specifically offering better dynamic behaviour of the propulsion system in which this type of integrated power transmission gearbox is included, in particular by reducing the pressures in the aforementioned bearings, and the friction during the deflection of this propulsion system about the tilting axis.

To achieve this, the tilting power transmission gearbox of the type presented above is characterised in that the two bearings are plain bearings each of which includes:

a fixed part integral with respectively one of the two side parts of said support, and including a sleeve, more or less cylindrical, approximately coaxial with said fixed part of the other bearing, about the tilting axis, a swiveling part integral with said tilting casing and including a more or less cylindrical annular trunnion, mounted to swivel about said sleeve of the fixed part of said bearing and more or less coaxial with the corresponding trunnion of the swiveling part of the other bearing, and a wear ring, including a cylindrical tubular part, engaged axially between said sleeve of said fixed part and said trunnion of said mobile part and a radial collar, protruding radially toward the outside of said tubular part and with respect to its axis, integral with an axial end of said tubular part which is turned towards said corresponding lateral part of the support.

In an advantageous embodiment, the casing is mounted to tilt between the two fixed and rigid lateral parts of the support and the sleeves of the fixed parts of the two plain bearings, extending towards one another, between said parts of said support.

In order not to generate any resisting couple when the transmission gearbox tilts, it is an advantage for the wear ring to be constructed on the basis of a material having a low friction coefficient, for instance PTFE, In addition, for better tilting set up of the casing thanks to the bearings, the wear ring of at least one bearing, and preferably of both, is secured to the swivelling part of said bearing.

The attachment of the wear ring to the swiveling part of the corresponding bearing is ensured, in a manner that benefits from simplicity, by at least three screws inserted in a direction more or less parallel to the tilting access, passing through said radial collar and attached to the swiveling part of said corresponding bearing, In addition, to decrease the Hertz pressures on the bearings, the tubular parts of the wear ring on at least one bearing, and preferably on each of them, will have a radial internal bearing surface the shape of which is slightly domed and convex toward the tilting axis while the location and amplitude of the domed convex shape will be such that the internal radial bearing surface is more or less cylindrical having a circular section and a load, more particularly static, taken up by said tilting casing.

In addition, to also decrease the pressure peaks at the axial ends of the inside radial bearing surface of the wear ring of at least one bearing, and preferably on each of them, this internal radial bearing surface will have, at least at one of its two axial ends, and preferably at each of the two axial ends, an arrangement forming a chamfer or an inclined face.

Finally, for application to a convertible aircraft with tilting rotors, the bearings will be solicited by an angular sector with a limited tilting movement of approximately 110° with a low speed of rotation between approximately 1 and approximately 2 rpm, with said tilting casing bearing with a static load about the tilting axis.

The invention also refers to an aircraft of the convertible type capable of operating in aircraft mode or helicopter mode, including at least one tilting power transmission gearbox designed to drive in rotation at least one rotor about a rotation axis from at least one power source, such as a motor-propulsion unit, with said rotor mounted to tilt with said transmission gearbox about a tilting axis more or less perpendicular to said axis of rotation to change between aircraft and helicopter mode, with the aircraft characterised in that said tilting power transmission gearbox is a transmission gearbox according to the invention as defined above.

Figure 2:
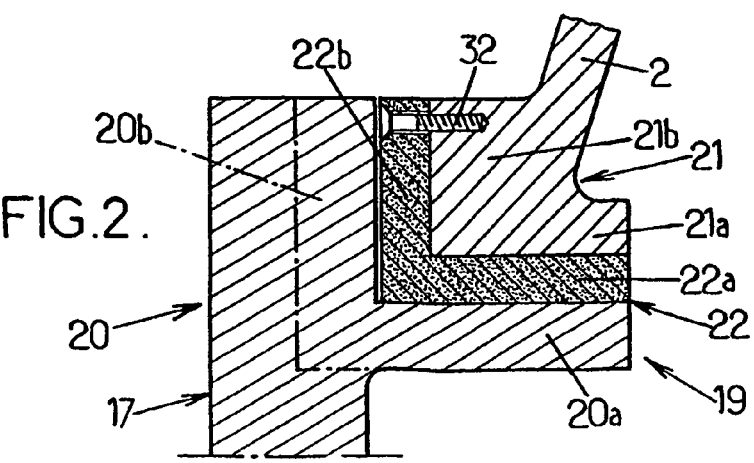
Figure 4:
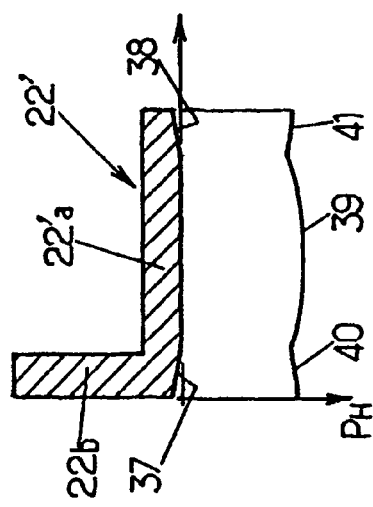
Figure 5:
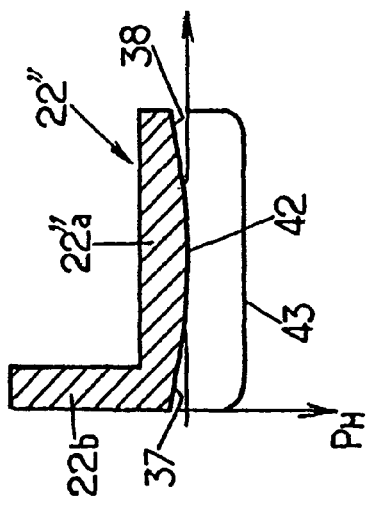
Figure 6:
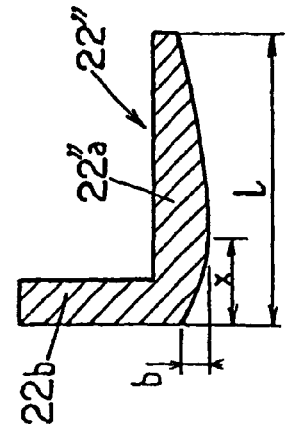
Figure 7:
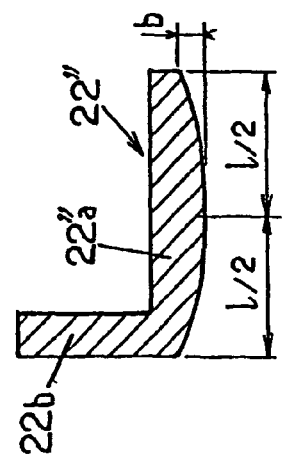
Figure 8:
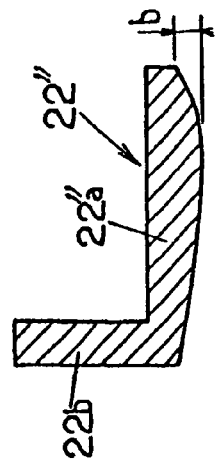

Other characteristics and advantages of the invention will be revealed in the description given below on a non-imitative basis, of an example of an embodiment described with reference to the attached illustrations in which:

FIG. 1 is a partial schematic sectional view of a tilting power transmission gearbox according to the invention, FIG. 2 is a partial schematic transversal sectional view on a larger scale of a bearing for the transmission gearbox of FIG. 1, FIGS. 3, 4 and 5 are axial sectional half-views of methods of obtaining the wear ring for the bearing of FIG. 2, with an associated curve representing the Hertz pressure and the pressures at the ends of the ring, and where FIGS. 6, 7 and 8 are schematic representations of other axial half-sections of the wear ring with alternative methods for obtaining the internal radial bearing surface domed aspect.

Tilting power transmission gearbox 1 shown in FIG. 1 includes a tilting casing 2 housing a reducing assembly which, in the aforementioned application, driving in rotation a tilting rotor of a convertible aircraft as described in the two documents of the aforementioned patent documents, establishes the front tilting reducer assembly, arranged like a main helicopter transmission gearbox, of a transmission connecting a motor to this rotor and an interconnection shaft to another similar transmission, said transmission including a non-tilting motor reducing assembly, supported by a structure secured to the aircraft structure, for instance the structure of a rear fixed part of a motor casing, the front tilting part of which encloses power transmission gearbox 1.

In the example shown here, the reducer assembly housed in tilting casing 2 has two reducing stages including one input stage 3 which is a reducing stage with a pair of spiro-conical driving gears including a primary conical driving gear 4 driven in rotation about the tilting axis B—B of transmission gearbox 1, by a coaxial shaft 5, itself driven in rotation from the non-tilting rear reducer assembly (not shown) with the teeth of conical driving gear 4 meshing with those of a secondary conical driving gear 6, integral in rotation, about an axis A—A, more or less perpendicular to the tilting axis B—B of a coaxial shaft 7 interconnecting with the first reducing stage or input stage 3 and the second reducing stage or output stage 8.

This reducing stage 8 is an epicyclic stage including a planet pinion 9 integral with shaft 7 and conical driving gear 6 in its rotation about the A—A axis and the toothing of which meshes with the toothing of planet driving gears 10 mounted to rotate about axes parallel to the A—A axis on a planet-holder 11, with the toothing of planet driving gears 10 also meshing with the inner toothing of a peripheral ring gear 12 attached to the inside of tilting casing 2. Planet holder 11 is integral in coaxial rotation about the A—A axis with a rotor mast 13, guided in rotation within casing 2 by bearings, not shown, and the other end of which protrudes out of casing 2 and is integral with hub 15 supporting the blades 16 of rotor 14, driven in rotation about the A—A axis, which is the axis of rotation of the rotor.

This rotor 14 and the power transmission gearbox 1 comprising reducer stages 3 and 8 are mounted to tilt around the tilting axis B—B with casing 2, mounted to tilt about this axis B—B between two fixed and rigid side parts 17 of a support, generally designated under reference 18, itself fixed and rigid, for instance, in the case of the application in question, a support rigidly linked with the structure of the rear fixed part of the engine casing, itself integral with the structure of an aircraft wing (represented schematically as P in FIG. 1).

The swivelling assembly of casing 2 about the B—B taxes and between the two lateral parts 17 of support 18 is provided by two coaxial plain bearings 19 turning about the B—B tilting axis and spaced away from one another along this axis B—B so that each bearing 19 is adjacent to respectively one of the lateral parts 17 of the fixed support.

As is also shown in detail and at a larger scale in the axial half section of FIG. 2, each bearing 19 includes a fixed part 20 integral with the lateral part of adjacent support 17 and includes a sleeve 20a, more or less cylindrical with a circular section and approximately coaxial with sleeve 20a of fixed part 20 of the other bearing 19, about the tilting axis B—B, each sleeve 20a extending towards the other sleeve 20a from the corresponding fixed lateral part 17. Each fixed part 20 also has an annular shoulder 20b, radial (with respect to the B—B axis) and protruding toward the outside of sleeve 20a, and that may be attached to the fixed lateral part of corresponding support 17 as schematically shown by the dotted lines in FIG. 2, or incorporated into this part 17.

Each bearing 19 also includes a swivelling part 21, integral with tilting casing 2, in the part of the latter extending under the ring gear 12 with this swivelling part 21 including an annular trunnion 21a which is more or less cylindrical and circular in section, at least on its internal radial bearing face, and which is more or less coaxial with trunnion 21a of the swivelling part 21 of the other bearing 19.

In each bearing 19, trunnion 21a of swivelling part 21 is mounted to swivel about the sleeve 20a of fixed part 20 and each bearing 19 also includes a wear ring 22 obtained on the basis of material with a low friction coefficient, for instance PFTE, interposed between the fixed part 20 and swivelling part 21 of the corresponding bearing 19 so as not to generate any resistant couple during the tilting of casing 2.

Each wear ring 22 has a tubular part 22a, more or less cylindrical with a circular section, engaged axially between sleeve 20a and trunnion 21a belonging respectively to fixed part 20 and swivelling part 21 of said bearing 19. Each wear ring 22 also has a radial collar 22b which is an annular collar protruding radially toward the outside of tubular part 22a corresponding to it, and with respect to the latter, integral with the axial ends of tubular part 22a that is turned towards the corresponding lateral part of support 17.

To facilitate assembly and improve the operation of bearing 19, each wear ring 22 is attached to swivelling part 21 of corresponding bearing 19 and, as shown in FIG. 2, this attachment is obtained, for instance, by three screws 32 that are screwed in more or less parallel to the B—B tilting axis through part of collar 22b of said ring 22 which is radially positioned toward the outside so that the end of the stem of screws 32 is screwed into the radial shoulder 21b connecting trunnion 21a of swivelling part 21 of bearing 19 to the remainder of tilting casing 2 with the heads of screws 32 embedded in the radial face in the outer axial position (towards the outside of bearing 19) of collar 22b.

In the application mentioned above of a tilting transmission gearbox 1 driving the tilting rotor of a convertible aircraft, the swivelling link provided by bearing 19 between tilting casing 2 and fixed support 18 working only in a small angular sector limited to approximately 110° on which bearings 19 are solicited with a speed of rotation about the B—B tilting axis that is relatively small, between approximately 1 and approximately 2 rpm whereas tilting casing 2 and therefore bearings 19 are statically loaded. Since bearings 19 are affected by a "false Brinnel effect", their plain structure, according to the invention, is far more advantageous than rolling housing bearings and, in addition, the use of plain bearings 19 with a wear ring 22 makes it possible to optimise the shape of the bearing surface in the inside radial position on the tubular part 22a of the wear ring 22, the internal radial bearing surface on which the swivelling link is made, thus reducing the Hertz pressures and the pressure peak at least at one end of the axial ends of this internal radial bearing surface.

Figure 3:
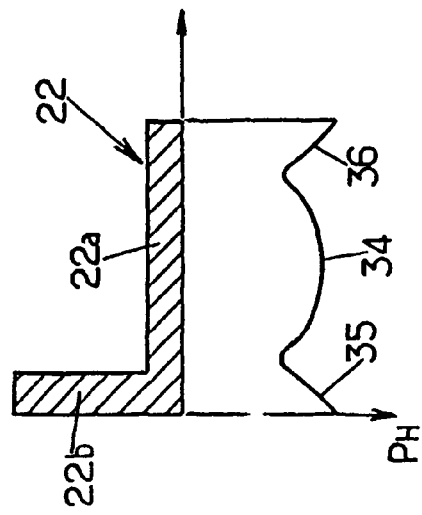

FIGS. 3 to 5 are a transversal sectional schematic representation of three internal bearing surface ring shapes superimposed on curves representing, depending on the axial position on ring 22, the amplitude of the Hertz pressures and the pressure peaks at the axial ends. FIG. 3 corresponds to ring 22 whose internal radial bearing surfaces and outer bearing surfaces of tubular part 22a are perfectly cylindrical with a circular section and corresponding Hertz pressure curve 34 shows considerable pressures with two pressure peaks at 35 and 36 at the axial ends of tubular section 22a.

FIG. 4 shows an initial variant of the wear ring 22' in which bevels 37 and 38 shaped as a chamfer or a truncated inclined section have been machined at each axial end of the internal radial bearing surface of tubular part 22'a. The corresponding Hertz pressure curve 39 represents lower pressure that is less variable according to the axial position than pressure curve 34 of FIG. 3, with, in addition, pressure peaks 40 and 41 that are highly attenuated at the axial ends.

The second variant of the wear ring 22" of FIG. 5 includes similar bevels 37 and 38 as ring 22' of FIG. 4 with, in addition, a domed central part 42, convex towards the inside of tubular part 22"a of this ring 22" with "doming" amplitude b of approximately several micrometers. It can be seen that pressure curve 43 is of almost constant amplitude over the entire axial dimension of ring 22" including at the axial ends, said Hertz pressure amplitude also being less than those of curve 39 in FIG. 4, which themselves are substantially less than the pressures given by curve 34 of FIG. 3.

Wear ring 22 of FIG. 2 is therefore, preferably, a ring like 22" of FIG. 5 in which, in addition, the location and amplitude b depend on the loading applied to corresponding bearing 19 and the deformations of the surrounding parts with the apex of the domed part possibly located more are less at the middle of the axial length "l" of tubular part 22"a of ring 22", as shown schematically in FIG. 7, or yet again, offset toward the axial end on the side of radial collar 22b, as shown schematically in FIG. 6 or to the contrary, offset toward the other axial end of this tubular part 22"a, as shown in FIG. 8. The choice between these different shapes and positions of the convex domed part of the internal radial bearing surface of a ring like 22" is made so that under load, in particular static as supported by tilting casing 2 and therefore corresponding bearing 19, this internal radial part takes on a more are less cylindrical section circular shape which will procure a Hertz pressure curve as shown in curve 43, relatively flat with a small amplitude, as shown in FIG. 5, without a pressure peak at the axial ends.

The use of plain bearing 19 equipped with wear rings like 22, 22' and above all 22", will obtain a considerable decrease in friction during swivelling about the B—B tilting axis, while substantially limiting the axial deflections of the propulsion system including a rotor 14 and an associated tilting power transmission gearbox 1, and a considerable decrease in the pressure in the associated bearings 19.

This produces better dynamic behaviour of the propulsion system and at bearings 19, eliminates the "false Brinnel effect".

The invention claimed is:

1. A tilting power transmission gearbox (1), designed to drive in rotation at least one driven part (14) about an axis of rotation (A—A) being able to swivel about a tilting axis (B—B), more or less perpendicular to said axis of rotation (A—A) of said driven device (14), such as the tilting rotor of a convertible aircraft with said transmission gearbox (1) having a housing (2) mounted to tilt with respect to two fixed and rigid lateral parts (17) of a support (18) via two coaxial bearings (19) about said tilting axis (B—B) and at intervals from one another along said tilting axis (B—B), characterised in that the two bearings (19) are plain bearings each of which includes:

a fixed part (20), integral with respectively one of the two lateral parts (17) of said support (18), and including a sleeve (20a) that is more or less cylindrical and that is approximately coaxial with sleeve (20a) of said fixed part (20) of the other bearing (19), around tilting axis(B—B).

a swivelling part (21) integral with said tilting casing (2) and including a more or less cylindrical annular trunnion (21a) mounted to swivel about said sleeve (20a) of fixed part (20) of said bearing (19) and more or less coaxial with the corresponding trunnion (21a) of the swivelling part (21) of the other bearing (19), and a wear ring (22) comprising a cylindrical tubular part (22a), engaged axially between said sleeve (20a) of said fixed part (20) and said trunnion (21a) of said mobile part (21), and a radial collar (22b), protruding radially toward the outside of said tubular part (22a) and with respect to its axis, and integral with an axial end of said tubular part (22a) which is turned towards said corresponding lateral part (17) of support (18).

2. A tilting power transmission gearbox according to claim 1, characterised in that said casing (2) is mounted to tilt between said 2 lateral parts (17) of said support (18), and sleeves (20a) of the fixed parts (20) of said plain bearings (19) extending towards one another between said lateral parts (17) of said support (18).

3. A transmission box according to claim 2, characterized in that said wear ring (22) is constructed on the basis of a material having a low friction coefficient, for instance, PTFE.

4. A transmission box according to claim 1, characterized in that said bearing ring (22) is constructed on the basis of a material having a low friction coefficient, for instance, PTFE.

5. A transmission gearbox according claim 1, characterized in that the wear ring (22) of at least one bearing (19) is attached to said swivelling part (21) of said bearing (19).

6. A transmission gearbox according to claim 5, characterised in that the attachment of said wear ring (22) to said swivelling part (21) of corresponding bearing (19) is provided by at least three screws (32) running in a direction more almost parallel to tilting axis (B—B), through said radial collar (22b), and screwed into said swivelling part (21) of said corresponding bearing (19).

7. A transmission gearbox according to claim 1, characterised in that said tubular part (22"a) of said wear ring (22") of at least one bearing (19) has an internal radial bearing surface whose shape is slightly domed and convex towards tilting axis (B—B), with the location and amplitude (b) of the convex domed shape being such that the internal radial bearing surface takes on a form more or less cylindrical and having a circular section under the load, essentially static, supported by said tilting casing (2).

8. A transmission gearbox according to claim 7, characterised in that said the internal radial bearing surface of said wear ring (22") of at least one bearing (19) in presence, has at least at one of its two axial ends, a bevel (37, 38) shaped as a chamfer or an inclined surface.

9. A transmission gearbox according to claim 1, characterized in that said bearings (19) are solicited in an angular sector having a limited tilting angle of approximately 110° with a low speed of rotation of between approximately 1 and approximately 2 rpm, of said tilting casing (2) loaded statically about tilting axis (B—B).

10. An aircraft of the convertible type capable of operating in aircraft mode or helicopter mode including at least one tilting power transmission gearbox (1) designed to drive in rotation at least one rotor (14) about an axis of rotation (A—A), from at least one source of power, such as a motor propulsion unit, said rotor (14) being mounted to tilt with said transmission gearbox (1) about a tilting axis (B—B) more or less perpendicular to said axis of rotation (A—A) to change between aircraft mode and helicopter mode, characterised in that said tilting power transmission gearbox (1) is a transmission gearbox according to claim 1.

* * * * *